Oct. 19, 1954  E. F. FULLWOOD  2,692,114
VALVE
Filed March 6, 1951

INVENTOR
EDWARD F. FULLWOOD
BY
ATTORNEY

Patented Oct. 19, 1954

2,692,114

UNITED STATES PATENT OFFICE 2,692,114

VALVE

Edward F. Fullwood, Madison, Wis., assignor to Air Reduction Company, Incorporated, New York, N. Y., a corporation of New York Application March 6, 1951, Serial No. 214,127

4 Claims. (Cl. 251—282)

This invention relates to fluid control valves and more particularly to improvements in such valves, adapting valves of this type for more satisfactory operation under conditions of reversible fluid flow.

Fluid control valves are commonly used in fluid circuits for actuation of fluid operated elements associated therewith. In such control circuits, it is often necessary to accommodate a reversal of the actuating fluid in order to enable the operation of the elements of the circuit in a forward or reverse direction. However, such fluid control valves are not always adapted to be used in this manner and objectionable circumstances often arise. For example, in a conventional fluid control valve the effect of the fluid pressure acting on the valve seating element, together with the seating force of the valve spring may be sufficient, when the fluid is supplied in one direction, to create an effective fluid-tight seal at the valve seat. But when the direction is reversed, the resultant force acting on the valve seating element may be insufficient to produce a fluid-tight seal and seating leakages will occur. On another occasion, the cumulative effect of the fluid pressure and the valve spring acting upon the valve element may be sufficient in one instance to produce a fluid-tight seal against the valve seat in one direction, but may cooperate to produce an excessive seating load on the valve element when the direction of fluid pressure is reversed. This causes undue difficulty in operating the valve to release the fluid.

It is therefore one object of the present invention to provide a fluid control valve adapted for reversible fluid flow, in which the effect of the fluid pressure on the valve seating element is substantially the same when the fluid is administered to the valve in either direction.

Another object of the invention is to provide a fluid control valve wherein the resultant fluid pressure acting on the valve seating element produces a closing force urging the seating element into closed relation with the valve seat, regardless of the direction in which the fluid pressure is administered to the valve.

A further object of the invention is to provide a fluid control valve of the type desired, which is of simple and inexpensive construction.

More specifically, the present invention comprises an improved valve construction in which the valve is provided with a valve seating element movable in a valve chamber to act against the valve seat separating valve inlet and outlet ports, which has oppositely extending stem portions on either side of the valve seat and provision for guiding such portions to maintain axial alignment of the seating element with the valve seat. Fluid sealing devices are provided around each stem portion and means are provided for venting the outer ends of both stem portions externally of the valve, whereby fluid introduced to the valve through either one of the valve ports exerts fluid pressure in one direction against the effective exposed area of the valve seating element and in the opposite direction against the effective area of the corresponding stem portion, the resultant fluid pressure against the valve seating member being dependent upon the difference in the effective areas of the valve seating element and the corresponding stem portion. Thus by providing the proper relationship between the effective area of the stem portion and the corresponding exposed portion of the valve seating element on both sides of the valve seat when the valve is closed, the effect of the fluid acting on the valve seating element can be determined for the delivery of the fluid in either direction and therefore made independent of the direction in which the fluid is administered to the valve. In the preferred construction, the valve chamber is closed at one end by a valve cap having means for retaining the valve seat and a chamber for accommodating one of the stem portions of the valve seating element.

One of the advantages inherent in the improved valve construction disclosed herein, is the added utility that the valve possesses in connection with cam actuating devices. With these devices it is desirable that the valve member provide an effective fluid-tight seal at the valve seat while at the same time having a relatively free motion so as to reduce the friction between the valve element and the valve actuating cam. For this reason it is advantageous to prevent excessive valve stem loading caused by high fluid pressure in the valve or by the reversal of the direction in which the fluid is applied to the valve.

Other objects and advantages will be apparent from the specification and claims, and from the accompanying drawing which illustrates the preferred embodiments of the invention.

Figure 2:
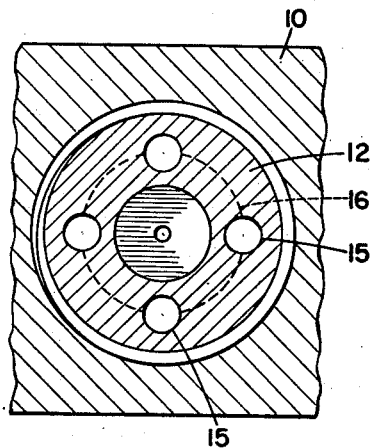
Figure 2 is a section taken along line 2—2 of Figure 1.

Referring to the drawing, 10 designates a valve housing in which a chamber 11 extends therethrough. A valve cap 12 threaded into one end of the chamber 11 is provided with an opening 13 which communicates through a radially enlarged recess 14 and longitudinal drillings 15 with the valve chamber. A series of four of the drillings 15 are arranged in an annular section of the valve cap, as shown in Figure 2, which open in turn into a recess 16 at the inner end of the valve cap. A second valve opening or port 17 communicates with the chamber 11 which is separated from the opening 13 and its communicating passages by a valve seat 18 having an opening 19 therethrough. The valve seat is secured against a shoulder 20 in the valve chamber by an annular rib projection 21 on the valve cap which presses against the valve seat and forms a fluid-tight seal between the upper and lower portions of the valve chamber. The valve openings 13 and 17 are connected to fluid conduits not shown in the drawing. Fluid may be delivered to the valve through opening 13 or alternatively in the reverse direction through opening 17.

A valve element 22 is movable in the chamber 11 for administering the fluid through the valve seat opening 19. The valve element comprises a spindle made up of two members 23 and 24, the member 23 having a threaded rod-like extension 25 on which member 24 is received, and a gasket 26 thereon which is compressed to form a fluid-tight connection between the members. A flange 23' on member 23 of the valve element is provided with a tapered face 27 adapted to engage an annular lip 28 on the valve seat around opening 19 to effect a fluid-tight seal. The upper end of member 23 is slidably received in a cavity 29 in the valve cap and the outer end of member 24 slides in a bore 30 in the valve housing, whereby the valve seating element is guided during its movement relative to the valve seat so that it will remain in precise axial alignment therewith. O-ring gaskets 31 are carried in recesses in the guided portions of the valve seating element to effectively prevent leakage of fluid from the valve chamber around the ends of the valve element.

The cavity 29 is vented externally of the valve through a drilled passage 32 in member 23 and a drilling 33 terminating at the outer end of member 24 which protrudes through bore 30 beyond the valve housing. An enlargement of the end of member 24 provides an annular shoulder 34 providing a surface confronting the chamber 11 in opposing relation to the tapered seating surface 27 exposed through the valve seat opening 19. A valve spring 35 is accommodated on shoulder 34 through which the compression of the spring acting against the valve seat 18 urges the valve element face 27 against the annular valve seat lip 28.

It will be seen, when the valve seat opening 19 is closed by valve element 22, that fluid admitted to the lower portion of chamber 11 through valve opening 17 will act oppositely against the opposing surfaces of the valve element exposed to the fluid pressure and will produce opposite forces thereon. The force of the fluid acting on the effective area of the valve element exposed through the valve seat opening 19 is thus opposed to the force produced on the opposing face 34 of the member 24. Similarly fluid introduced in the reverse direction through valve opening 13 acts in one direction against the back of the flange portion 23' of member 23 and oppositely against the portion of seating surface 27 above the line of the engagement with the annular lip 28. In the preferred construction the effective exposed areas of the oppositely disposed surfaces which correspond to the introduction of the fluid at opposite sides of the valve seat are proportioned to produce the same resultant force on valve seating element 22 when the fluid is delivered through valve opening 13 as when it is delivered through opening 17. Moreover, this arrangement may be so provided that the resultant force of the fluid will in all cases be in the direction of closing the valve seat so that even with increases in fluid pressure positive sealing of the valve will be assured.

For example, the effective area $A_{34}$ of the shoulder 34 on member 24 may be made larger than the effective area $A_{27}$ of seating surface 27 exposed to the fluid from below the valve seat through valve seat opening 19 so that a resultant fluid force $p(A_{34}-A_{27})$ will be produced in a downward direction tending to close the valve seat. When fluid is introduced in the upper portion of chamber 11, with the effective area $A_{23'}$ of the back of flange 23' greater than the exposed projected area $A_{27'}$ of the valve seating surface 27, a resultant force $p(A_{23'}-A_{27'})$ tends to close the valve. In each case the fluid passing around the stem members in the cavity 29 and in the bore 30 exerts pressure against opposite and substantially equal areas of the gasket means 31 and the retaining groove so that substantially no resultant force is produced on the valve seating element by the fluid pressure acting thereon. By proportioning the valve seating element and the diameter or the valve seat opening 19, so that the factors $(A_{34}-A_{27})$ and $(A_{23'}-A_{27'})$ are equal, a positive sealing force, that is equal no matter which direction the fluid is administered, will be obtained. In addition, the areas $A_{34}$ and $A_{27}$ may be made equal, as also may the areas $A_{23'}$ and $A_{27'}$, so that the resultant force exerted by the fluid on the valve seating member will always be substantially zero. Thus the only force acting on the valve member would be afforded by the valve spring 35 and this force would not increase or decrease even though the fluid pressure varied. This may be particularly advantageous in connection with cam actuating mechanisms for the valve wherein the frictional bearing load on the cam remains unchanged under all conditions of operation permitting smooth and easy operation of the valve.

It will be apparent that in the foregoing, the factor $A_{34}-A_{27}$ representing the effective area acted upon by the fluid when the fluid is administered through the opening 17, is equivalent to the difference in the area $A_{30}$ of the externally exposed portion of valve member 24 and area $A_{19}$ of the valve seat opening 19. Also, the factor $A_{23'}-A_{27'}$ is equivalent to the difference in the area $A_{29}$ of the opening of cavity 29 corresponding to the externally exposed area of valve member 23 and the area $A_{19}$ of the valve seat opening. Thus the magnitude of the factors, and therefore the effect produced by the fluid acting on the valve element 22, is determined by the diameters of the bore 29, valve seat opening 19 and the bore 30 independently of the contour of the valve element. It is further evident that when the valve is not closed and the fluid fills the valve chamber, the force exerted by the fluid on valve element 22 will depend upon the difference in the areas of the opposite exposed ends of the valve element members 23 and 24.

Figure 3:
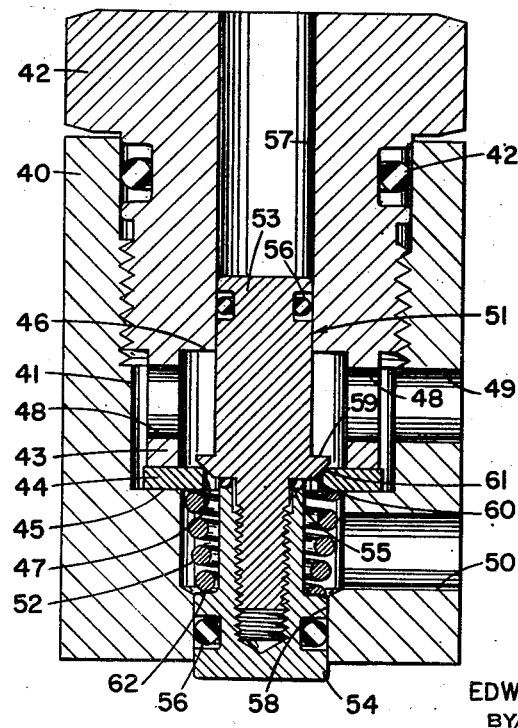
Figure 3 is a longitudinal sectional view of an alternative form of construction.

An alternative construction is shown in Figure 3 in which a valve housing is designated at 40 having a chamber 41 extending therethrough. A valve cap 42 having an O-ring fluid seal 42′ is threaded into one end of the chamber, on which is provided a tubular protrusion 43 that presses valve seat 44 against a shoulder 45 in a fluid-tight manner. A cavity 46 is formed in the tubular section 43, contingent to a valve seat opening 47 in the valve seat communicating with the lower section of the valve chamber. Radial drillings 48 in the tubular extension of the valve cap enter into the surrounding portion of the chamber 41. Valve ports 49 and 50, at the upper and lower chamber sections respectively, are adapted to be connected to fluid conduits not shown in the drawing. A valve element 51 is movable in the valve chamber for cooperation with valve seat 44 to regulate the flow of fluid through the valve seat opening 47 between the ports 49 and 50. A valve spring 52 is carried on valve element 51 by which the element is urged into seated position on valve seat 44.

Figure 1:
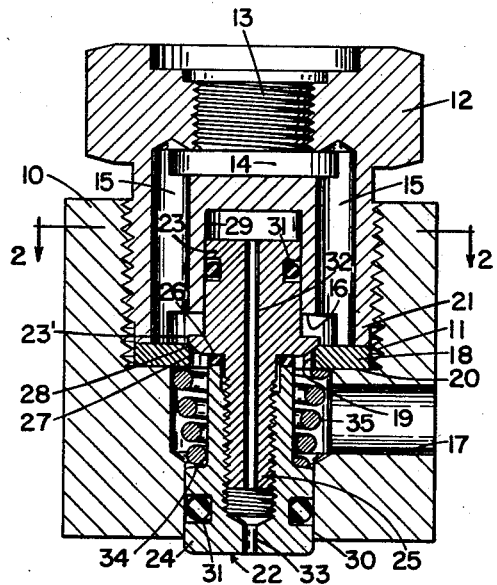
Figure 1 is a longitudinal sectional view of a fluid valve having an improved construction according to the invention.

The valve element 51 is of composite construction and is substantially the same as the valve element 22 in the valve of Figure 1, except that it has no central passage therethrough. Thus a member 53 is threaded into a second member 54 forming a single spindle element on which a gasket 55 forms a fluid-tight seal between the two sections. Member 53 carrying fluid sealing means at 56 is slidably received in a bore 57 in valve cap 42, and member 54 is received in a similar fashion in a bore 58 in the bottom of the valve housing, also carrying fluid sealing means 56. Bores 57 and 58 expose the opposing ends of the valve member externally and guide the valve member axially with respect to the valve seat. A flange portion 59 on the member 53 is provided with a tapered seating surface 60 adapted to engage a valve seat lip 61 around the valve seat opening. An enlargement of the member 54 provides a shoulder 62 facing the valve seat accommodating one end of the valve spring 52 which is compressed at its other end against valve seat 44.

The arrangement and form of the valve spindle element 51 in the valve housing are the same as before described in connection with valve 10, whereby the effect of the fluid acting on the valve element may be predetermined and caused to produce the desired resultant fluid pressure force on the valve seating element.

The operation of the valves shown and described above is now best explained in connection with the valve 10 in Figure 1. Fluid is administered to the valve 10 in either direction such that the fluid may be first delivered alternatively to the upper or the lower section of the valve chamber 11 connecting with the valve ports 13 and 17 respectively. Passage of fluid through the valve is prevented by the engagement of the valve seating element with the valve seat which is maintained by the force of the valve spring and whatever force resulting from the exertion of fluid pressure is acting thereon. When it is desired to deliver the fluid past the valve a force is applied to the protruding end of the valve member 22 causing depression of the member into the valve housing which separates the seating surface 27 and valve seat lip 28. Fluid flow is stopped by releasing the valve member 22 which is then returned to seated or closed position by the valve spring and any resultant force of the fluid which may be acting thereon.

The invention is not limited to the specific embodiment herein illustrated and described, but may be used in other ways without departure from its spirit as defined by the following claims.

I claim:

1. A reversible flow circuit fluid control valve comprising a valve housing, a cavity therein, a valve cap threaded into said cavity to form a valve chamber, valve inlet and outlet ports communicating with said valve chamber, a valve seat between said valve ports having a valve seat opening, a pair of cylindrical guide passages in substantially axial alignment with said valve seat opening and on opposite sides thereof, one of said passages being formed in said valve cap, the other of said passages being formed in said valve housing, a valve element having opposite cylindrical end portions slidable within said guide passages and a middle portion extending through said valve seat opening, said middle portion having an annular flange one face of which comprises a frusto-conical surface adapted to be engaged by said valve seat, O-ring gasket means carried by said valve element cylindrical portions affording a fluid tight seal in each of said guide passages effectively excluding chamber fluid from the opposite ends of said valve element, and means exposing the opposite ends of said valve element to the pressure external to said valve chamber, said valve element being in two separable parts, one of said parts including one of said cylindrical valve element portions and being disposed on the side of said valve seat opposite to said frusto-conical valve seating surface, said cylindrical portion having a diameter larger than said valve seat opening and said other cylindrical portion having a diameter less than said valve seat opening such that pressure fluid introduced through either of said valve ports urges said valve element toward seated position.

2. A reversible flow circuit fluid control valve comprising a valve housing, a cavity therein, a valve cap threaded into said cavity to form a valve chamber, a valve seat dividing said chamber into upper and lower chamber sections, means forming a part of said valve cap engageable with said valve seat to produce a fluid tight seal between said upper and lower chamber sections, a valve seat opening in said valve seat between said chamber sections, a valve port in said valve cap communicating with said upper chamber section, a second valve port communicating with said lower chamber section, a cylindrical dead-end guide bore in said valve cap, a second guide bore formed in said valve housing in said lower chamber section opening externally of said chamber, a valve element extending through said valve chamber slidably received within said guide bores in axial alignment with said valve seat, valve seating means carried thereon for engagement with said valve seat, O-ring sealing means carried by said valve element to effect a fluid tight seal in each of said guide bores, and a passage extending through said valve element between the opposite ends thereof, said valve element comprising two separable parts, one part having a piston portion slidable within said valve cap bore and provided with a radially projecting annular flange having a frusto-conical face adapted for engagement with said valve seat, said other valve element part forming a piston slidable within said second guide bore, said piston diameters and said valve seat opening diameter being selected to produce a predetermined resultant fluid force on said valve element in the direction of seating when pressure fluid is delivered through either of said valve ports.

3. A fluid valve comprising a valve body, a cylindrical cavity formed in said valve body having an outer portion of larger diameter and an inner portion of reduced diameter forming a shoulder therebetween, an annular valve seat positioned against said shoulder and extending radially inwardly to define a cylindrical valve seat opening of smaller diameter than said cavity portion of reduced diameter, said inwardly extending valve seat providing a terminal shoulder in said inner cavity, a valve cap threadedly received in said outer portion of said valve cavity forming a valve chamber, said valve cap being engageable at its inner end with said valve seat to compress it against said shoulder and form a fluid tight seal therewith, inlet and outlet fluid ports communicating with said valve chamber on opposite sides of said valve seat, a cylindrical guide bore formed in said valve cap in substantially axial alignment with said valve seat opening, a second cylindrical guide bore formed in said valve body in substantially axial alignment with said valve seat opening, a spindle having cylindrical end portions slidably received in said guide bores, means exposing the ends of said spindle to pressure externally of said valve chamber, O-ring sealing means carried thereon to effect a fluid tight seal in each of said bores, a circumferential radially projecting flange formed on said spindle intermediate said end portions, said flange being disposed in said larger diameter chamber and having a frusto-conical face thereon for engagement with said valve seat, said spindle end portion disposed in said lower chamber forming a detachable part of said spindle having means for attachment to said spindle and a section of reduced diameter forming a shoulder thereon, and a spring compressed between said shoulder and said terminal shoulder of said inner cavity urging said valve seating surface into engagement with said valve seat, said valve seat opening being of larger diameter than said spindle end portion received in said valve cap bore and said detachable spindle end portion being of larger diameter than said valve seat opening, to produce a resultant fluid force urging said spindle toward seated position when pressure is delivered through either of said valve ports.

4. A reversible flow circuit fluid control valve comprising a valve housing, a cavity therein, a valve cap threaded into said cavity forming a closed valve chamber, a valve seat dividing said chamber into upper and lower chamber sections, means forming a part of said valve cap engageable with said valve seat to produce a fluid seal between said upper and lower chamber sections, a valve seat opening in said valve seat between said chamber sections, a valve port in said valve cap communicating with said upper chamber section, a second valve port communicating with said lower chamber section, a cylindrical deadend guide bore in said valve cap, a second guide bore formed in said valve housing in said lower chamber section opening externally of said chamber, a valve element extending through said valve chamber slidably received within said guide bores in axial alignment with said valve seat, valve seating means carried thereon for engagement with said valve seat, O-ring sealing means carried by said valve element to effect a fluid-tight seal in each of said guide bores, and a passage extending through said valve element between the opposite ends thereof, said valve element comprising a spindle having two separable parts, one part having a piston portion slidable within said valve cap bore, said other valve element part having a piston portion slidable within said second guide bore, means for threadedly assembling said spindle parts and sealing means therebetween surrounding said passage extending through the valve element between the opposite ends thereof.

References Cited in the file of this patent

UNITED STATES PATENTS

| Number | Name | Date |
|---|---|---|
| 240,982 | Dutton | May 3, 1881 |
| 560,550 | Smith | May 19, 1896 |
| 1,945,645 | Kupman et al. | Feb. 6, 1934 |
| 1,957,567 | Williams | May 8, 1934 |
| 2,294,702 | Van Der Werff | Sept. 1, 1942 |
| 2,431,437 | Van Der Werff | Nov. 25, 1947 |
| 2,482,223 | Strid et al. | Sept. 20, 1949 |
| 2,490,944 | Buchanan | Dec. 13, 1949 |
| 2,639,884 | Mitchell | May 26, 1953 |